J. M. BATEMAN.
LOCK WASHER.
APPLICATION FILED MAR. 8, 1915.
1,180,561. Patented Apr. 25, 1916.
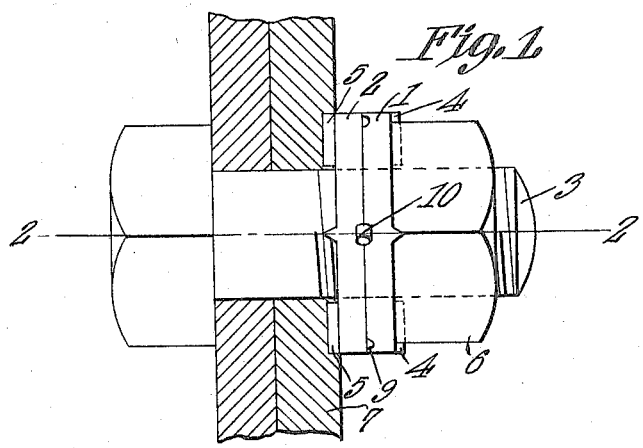
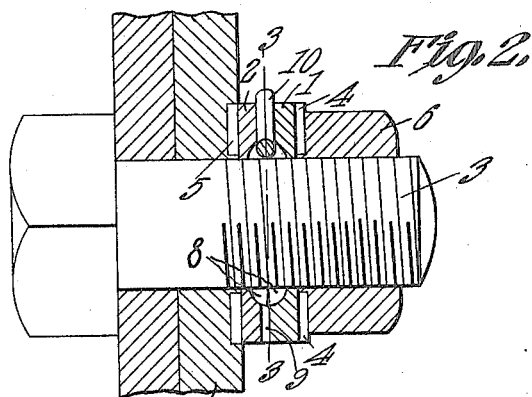
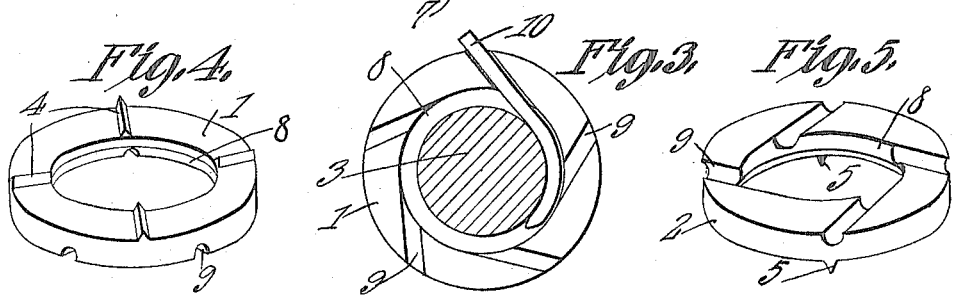
Witnesses
J. M. Bateman,
Inventor
by
Attorneys

UNITED STATES PATENT OFFICE.

JOHN M. BATEMAN, OF COALINGA, CALIFORNIA.

LOCK-WASHER.

1,180,561.   Specification of Letters Patent.   Patented Apr. 25, 1916.

Application filed March 8, 1915. Serial No. 12,902.

*To all whom it may concern:*

Be it known that I, JOHN M. BATEMAN, a citizen of the United States, residing at Coalinga, in the county of Fresno and State of California, have invented a new and useful Lock-Washer, of which the following is a specification.

The present invention appertains to nut locks, and aims to provide novel and improved means for locking a nut upon a bolt whereby the nut is not liable to be accidentally loosened or unscrewed in spite of the fact that the device may be subjected to severe vibrations and strains.

The object of the invention is the provision of a novel lock washer adapted to be used upon the bolts or rail joints or upon other bolts, for holding the nut in place upon a bolt, the washer having novel means for accomplishing this result.

It is also the object of the invention to provide a lock washer which enables the nut to be readily tightened, without interference, and whereby after the nut is tightened, the parts may be securely locked in place.

It is also within the scope of the invention to provide a lock washer which is comparatively simple, compact, non-encumbering and inexpensive in construction, and which is convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the lock washer as applied. Fig. 2 is a sectional view thereof taken approximately on the line 2—2 of Fig. 1. Fig. 3 is a cross sectional view taken on the line 3—3 of Fig. 2. Fig. 4 is a perspective view of one of the washer sections. Fig. 5 is a perspective view of the other washer section.

The present washer comprises two annular sections 1 and 2, or in other words, the washer is divided between its faces to provide the two sections to coöperate or mate one another. The sections 1 and 2 are adapted to be slipped upon the bolt 3, and are provided at their remote sides or faces with any suitable number of radial ribs, teeth or other means 4 and 5, respectively, for engaging or biting the nut 6 and object 7, respectively. Thus, the washer section 1 which is disposed next to the nut 6, is provided with the ribs, teeth or other means for biting or engaging the nut 6, so that the section 1 will rotate with the nut, or whereby the section 1 and nut 6 will be locked against rotatory movement relative to one another when the parts are clamped together. In the same manner, the washer section 2 which is disposed next to the object 7 clamped by the bolt, is provided with the ribs, teeth or other means 5 for engaging or biting the object 7 to prevent the section 2 from rotating relative to the object 7. The bolt 3 may be prevented from rotating relative to the object 7 by any well known means.

In order to lock the sections 1 and 2 of the washer against relative rotation when the nut is tightened, the adjacent faces or sides of the sections 1 and 2 are provided with coöperating inner annular rabbets 8 surrounding their apertures, and the inner or adjacent sides or faces of the sections 1 and 2 are also provided with any suitable number of non-radial grooves 9 extending chordally from the respective rabbets 8 to the peripheries of the sections. The grooves 9 are tangential with the rabbets 8. The grooves 9 of the two sections coöperate with one another, and are of different numbers on the two sections, whereby two of the grooves 9 of the two sections will aline or register with one another at various angular positions of the sections 1 and 2 relative to one another. This is essential, since the section 1 being rotated with the nut 6 when the nut is tightened, will stop when the nut is tightened to the limit, and it is therefore necessary that a pair of the grooves 9 of the two washer sections be in alinement, for the reception of the locking pin or key 10. This solid locking pin or key 10 is pointed and its pointed or active end portion is flexible or bendable.

In use, the sections 1 and 2 of the washer are slipped onto the bolt 3 in the manner that an ordinary washer is applied to the bolt, and the nut 6 is then threaded upon the bolt. When the nut 6 is tightened, the sections 1 and 2 will be clamped between the object 7 and nut 6, and the ribs or teeth 5 and 4 will then engage or bite into the object and nut, respectively, to hold the section 2 stationary relative to the object 7, and to cause the section 1 to rotate with the nut 6. Since the adjacent faces or sides of the sections 1 and 2 bear snugly against one another, the section 1 may rotate freely until the nut 6 is tightened to the limit, in which event, the nut 6 and section 1 will bind. A pair of the grooves 9 of the sections 1 and 2 of the washer will then be in alinement, due to the arrangement of the grooves, whereby the locking pin or key 10 may be inserted or driven into the registering grooves. Due to the chordal arrangement of the grooves, when the pin 10 is driven into the registering or alining grooves, the pointed end of the pin will be deflected by the bolt 3 into the coöperating rabbets 8, and will thence pass partially around the bolt 3 within the rabbets 8, as shown in Fig. 3. The pin or key 10 in engaging the registering or alining grooves 9 of the washer sections, will lock the washer sections against relative rotation, and this will prevent the section 1 from being rotated relative to the section 2, and since the nut 6 is prevented from rotating relative to the section 1, the nut will be prevented from loosening or unscrewing, notwithstanding the fact that the bolt may be subjected to severe vibrations or shocks. The key or pin 10 in being bent within the rabbets 8, will prevent the pin from being accidentally detached from the washer, although the pin or key 10 may be left protruding slightly from the washer, so that the pin may be forcibly extracted by means of a pair of pliers, or other suitable instrument, when it is desired to release the nut.

When the key or pin 10 is driven into place, it has a straight part fitting in the respective registering grooves and projecting into the rabbets, and a curved part fitting within the rabbets and fitting one side of the bolt, as indicated in Fig. 3. Although the curved or bent portion securely holds the pin in place, it can be unbent readily when the pin is extracted forcibly. The arrangement of the grooves 9 is of advantage, since the pin, in straight condition, can be driven readily through the registering grooves, and will not be bent until the pointed end of the pin engages the walls of the rabbets. In other words, the pin is not driven against the bolt, but is bent by the walls of the rabbets to conform to the curvature of the bolt.

Having thus described the invention, what is claimed as new is:

In combination, a bolt, a washer thereon embodying a pair of sections, a nut threaded upon the bolt, one washer section and the nut having interengaging portions to prevent the relative rotation thereof, the adjacent faces of the washer sections having coöperating annular rabbets and a pair of registering chordal non-radial grooves tangential with and extending from the rabbets, and a solid pin having a straight part fitting in said grooves and projecting into said rabbets and a curved part within the rabbets and fitting one side of the bolt.

In testimony that I claim the foregoing as my own, I have hereto affixed my signature in the presence of two witnesses.

JOHN M. BATEMAN.

Witnesses:
W. J. KELBY,
J. A. NICHOL.

Copies of this patent may be obtained for five cents each, by addressing the "Commissioner of Patents, Washington, D. C."